(12) United States Patent
Han

(10) Patent No.: US 10,704,116 B2
(45) Date of Patent: Jul. 7, 2020

(54) HIGH-STRENGTH THIN STEEL SHEET WITH EXCELLENT DRAWABILITY AND BAKE HARDENABILITY, AND METHOD FOR MANUFACTURING SAME

(71) Applicant: POSCO, Pohang-si (KR)

(72) Inventor: Sang-Ho Han, Gwangyang-si (KR)

(73) Assignee: POSCO, Pohang-si (KR)

( * ) Notice: Subject to any disclaimer, the term of this patent is extended or adjusted under 35 U.S.C. 154(b) by 343 days.

(21) Appl. No.: 15/579,406

(22) PCT Filed: Jun. 7, 2016

(86) PCT No.: PCT/KR2016/006005
§ 371 (c)(1),
(2) Date: Dec. 4, 2017

(87) PCT Pub. No.: WO2016/195456
PCT Pub. Date: Dec. 8, 2016

(65) Prior Publication Data
US 2018/0142318 A1   May 24, 2018

(30) Foreign Application Priority Data

Jun. 5, 2015  (KR) .................. 10-2015-0080046
Mar. 28, 2016  (KR) .................. 10-2016-0037117

(51) Int. Cl.
| | |
|---|---|
| *C21D 9/46* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C23C 2/06* | (2006.01) |
| *B32B 15/01* | (2006.01) |
| *C21D 6/00* | (2006.01) |
| *C23C 2/28* | (2006.01) |

(52) U.S. Cl.
CPC .............. *C21D 9/46* (2013.01); *B32B 15/013* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/0273* (2013.01); *C22C 38/00* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/14* (2013.01); *C23C 2/06* (2013.01); *C23C 2/28* (2013.01)

(58) Field of Classification Search
CPC ...... B32B 15/013; C21D 6/005; C21D 6/008; C21D 8/02; C21D 8/0205; C21D 8/0226; C21D 8/0236; C21D 8/0247; C21D 8/0263; C21D 8/0273; C21D 9/46; C22C 38/00; C22C 38/002; C22C 38/004; C22C 38/02; C22C 38/04; C22C 38/06; C22C 38/12; C22C 38/14; C23C 2/06; C23C 2/28

See application file for complete search history.

(56) References Cited

U.S. PATENT DOCUMENTS

| | | | |
|---|---|---|---|
| 5,690,755 A | 11/1997 | Yoshinaga et al. | |
| 5,954,896 A | 9/1999 | Koyama et al. | |
| 2003/0160558 A1* | 8/2003 | Ohmae | C21D 8/0273 313/402 |
| 2007/0181232 A1 | 8/2007 | Han et al. | |

FOREIGN PATENT DOCUMENTS

| | | |
|---|---|---|
| JP | 61276923 | 12/1986 |
| JP | 61276923 A * | 12/1986 |
| JP | 61276931 | 12/1986 |
| JP | 61276931 A * | 12/1986 |
| JP | 04280943 | 10/1992 |
| JP | 05070836 | 3/1993 |
| JP | 05263184 | 10/1993 |
| JP | 07278770 | 10/1995 |
| JP | 10096051 | 4/1998 |
| JP | 2000199033 | 7/2000 |
| JP | 2002249849 | 9/2002 |
| JP | 2003253378 | 9/2003 |
| JP | 2004131754 | 4/2004 |

(Continued)

OTHER PUBLICATIONS

European Search Report—European Application No. 16803809.9, dated Feb. 6, 2018, citing JP S61 276923, U.S. Pat. No. 5,690,755, U.S. Pat. No. 5,954,896 and JP S61 276931.

(Continued)

*Primary Examiner* — Jenny R Wu
(74) *Attorney, Agent, or Firm* — Cantor Colburn LLP

(57) ABSTRACT

A high-strength thin steel sheet having excellent drawability and bake hardenability, and a method of manufacturing the same are provided. The high-strength thin steel sheet includes 0.0005 to 0.003 wt % of carbon (C); 0.5 wt % or less (excluding 0 wt %) of silicon (Si); 1.2 wt % or less (excluding 0 wt %) of manganese (Mn); 0.005 to 0.12 wt % of phosphorous (P); 0.008 wt % or less of sulfur (S); 0.005 wt % or less of nitrogen (N); 0.1 wt % or less (excluding 0 wt %) of acid-soluable aluminum (Al); 0.01 to 0.04 wt % of titanium (Ti); iron (Fe) as a remainder thereof; and unavoidable impurities. The high-strength thin steel sheet has BH of 4 MPa or more and P of 80% or more in Equation 1: P (%)={$N_{in}$/($N_{in}$+$N_{gb}$)}×100, $N_{in}$ being the number of carbides having a size of 20 nm or less within a crystal grain, and $N_{gb}$ being the number of carbides having a size of 20 nm or less at a grain boundary.

14 Claims, 1 Drawing Sheet

(56) References Cited

FOREIGN PATENT DOCUMENTS

| | | |
|---|---|---|
| JP | 2007530783 | 11/2007 |
| JP | 2009114496 | 5/2009 |
| JP | 2010077513 | 4/2010 |
| JP | 2014028998 | 2/2014 |
| KR | 20150037247 | 4/2015 |

OTHER PUBLICATIONS

International Search Report—PCT/KR2016/006005 dated Aug. 18, 2016.

* cited by examiner

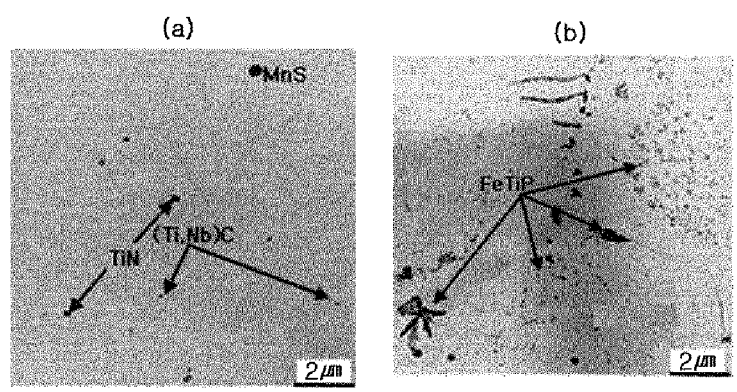

HIGH-STRENGTH THIN STEEL SHEET WITH EXCELLENT DRAWABILITY AND BAKE HARDENABILITY, AND METHOD FOR MANUFACTURING SAME

TECHNICAL FIELD

The present disclosure relates to a high-strength thin steel sheet and a method of manufacturing the same, and more particularly, to a high-strength thin steel sheet having excellent drawability and bake hardenability, able to be used as a material for automobile exterior materials or the like, and a method of manufacturing the same.

BACKGROUND ART

Steel used as a material for internal and external plates of automobiles such as doors, hoods, fenders, floors and the like is required to have not only high strength but also excellent formability, to ensure the safety of passengers from accidents and to improve fuel efficiency by reducing the weight of cars.

However, since an increase in the strength of steel sheets may cause a deterioration of formability, it may be very difficult to satisfy both of the above factors, strength and formability, at the same time. Particularly, in the case of components requiring relatively high formability, such as internal door panels, rear floor panels and the like, since defects in formability such as the occurrence of cracks in a process often occurs, the application of high strength steels to such components is limited.

As a known steel sheet having excellent strength and formability, having been developed to date, there is so-called interstitial free (IF) steel to simultaneously secure strength and formability, by adding strong carbonitride forming elements such as titanium (Ti) and/or niobium (Nb) or the like to remove a solid solution element such as carbon (C), nitrogen (N), sulfur (S) or the like, which is representatively disclosed in Patent Documents 1 to 4. However, the IF steel has an average plastic anisotropy coefficient (lankford value, r value) of 1.5 to 1.8, and is insufficient to substitute for components for which an existing deep-drawing-quality (DDC) soft cold rolled steel sheet is used.

(Patent Document 1) Japanese Patent Laid-Open Publication No. 1992-280943

(Patent Document 2) Japanese Patent Laid-Open Publication No. 1993-070836

(Patent Document 3) Japanese Patent Laid-Open Publication No. 1993-263184

(Patent Document 4) Japanese Patent Laid-Open Publication No. 1998-096051

DISCLOSURE

Technical Problem

An aspect of the present disclosure is to provide a high-strength thin steel sheet having excellent drawability and bake hardenability and a method of manufacturing the same.

Technical Solution

According to an aspect of the present disclosure, a high-strength thin steel sheet having excellent drawability and bake hardenability includes 0.0005 wt % to 0.003 wt % of carbon (C); 0.5 wt % or less (excluding 0 wt %) of silicon (Si); 1.2 wt % or less (excluding 0 wt %) of manganese (Mn); 0.005 wt % to 0.12 wt % of phosphorous (P); 0.008 wt % or less of sulfur (S); 0.005 wt % or less of nitrogen (N); 0.1 wt % or less (excluding 0 wt %) of acid-soluable aluminum (Al); 0.01 wt % to 0.04 wt % of titanium (Ti); iron (Fe) as a remainder thereof; and unavoidable impurities. The high-strength thin steel sheet has P of 80% or more, P being defined by Equation 1: $P (\%) = \{N_{in}/(N_{in}+N_{gb})\} \times 100$, where $N_{in}$ denotes the number of carbides present within a crystal grain while having a size of 20 nm or less, and $N_{gb}$ denotes the number of carbides present at a grain boundary while having a size of 20 nm or less, and has a bake hardening amount (BH) of 4 MPa or more.

According to an aspect of the present disclosure, a method of manufacturing a high-strength thin steel sheet having excellent drawability and bake hardenability includes hot-rolling a steel slab including 0.0005 wt % to 0.003 wt % of carbon (C), 0.5 wt % or less (excluding 0 wt %) of silicon (Si), 1.2 wt % or less (excluding 0 wt %) of manganese (Mn), 0.005 wt % to 0.12 wt % of phosphorous (P), 0.008 wt % or less of sulfur (S), 0.005 wt % or less of nitrogen (N), 0.1 wt % or less (excluding 0 wt %) of acid-soluable aluminum (Al), 0.01 wt % to 0.04 wt % of titanium (Ti), iron (Fe) as a remainder thereof, and unavoidable impurities, and obtaining a hot-rolled steel sheet; winding the hot-rolled steel sheet at a temperature of 450° C. to 750° C.; cold-rolling the wound hot-rolled steel sheet under conditions of a reduction ratio of 75% to 85% and a final rolling reduction ratio of 5% to 15%, to obtain a cold-rolled steel sheet; continuously annealing the cold-rolled steel sheet by performing temperature rising to 830° C. to 880° C. at a rate of 7° C./sec or lower (excluding 0° C./sec) and then maintaining the rising temperature for 30 sec. to 80 sec.; and cooling the annealed cold-rolled steel sheet to 650° C. at an average cooling rate of 2° C./sec to 10° C./sec.

In addition, the solution of the above-mentioned problems does not list all the features in the present disclosure. The various features in the present disclosure and the advantages and effects thereof will be more fully understood by referring to the specific following embodiments.

Advantageous Effects

As one of various effects according to an exemplary embodiment in the present disclosure, the high-strength thin steel sheet according to an exemplary embodiment may have excellent drawability and bake hardenability, and may be used as a material of an external automobile panel or the like.

DESCRIPTION OF DRAWINGS

FIG. 1 provides images obtained by observing cross sections of ¼t points of thin steel sheets, in replica, using TEM.

BEST MODE

As a result of research aimed at solving the problems of the related art described above, the present inventors have found that a high-strength thin steel sheet having significantly improved drawability and bake hardenability may be manufactured by adding titanium (Ti) alone, as a strong carbonitride forming element, to steel, or adding titanium (Ti) and niobium (Nb) to steel together, to remove solid solution elements such as carbon (C), nitrogen (N), sulfur (S) and the like, by appropriately controlling a distribution position of carbides or the like, generated as a result of the removal of the solid solution element, and by allowing solid solution carbon having been redissolved during annealing to remain at an appropriate level, according to an exemplary embodiment in the present disclosure.

Hereinafter, a high-strength thin steel sheet having excellent drawability and bake hardenability according to an exemplary embodiment will be described in detail. First, an alloy composition of a high-strength thin steel sheet according to an exemplary embodiment will be described in detail.

Carbon (C): 0.0005 to 0.003 wt %

C is an interstitial solid solution element and has a significant influence on texture formation of a steel sheet during cold rolling and annealing. In detail, in a case in which an amount of solid solution carbon in steel increases, growth of crystal grains having a {111} texture, beneficial for drawing work, is suppressed, growth of crystal grains having {110} and {100} textures is promoted, and thus, drawability of an annealed sheet may be deteriorated. Further, in a case in which a content of C is excessive, a content of Ti required to precipitate C as a carbide may be excessive, disadvantageous from the viewpoint of economical efficiency, which may be problematic in that a large amount of fine TiC precipitate may be distributed in steel, and thus, drawability may be rapidly deteriorated. Thus, an upper limit of the content of C may be controlled to 0.003 wt %, in detail, 0.0028 wt %, and in further detail, 0.0025 wt %. On the other hand, as the content of C is reduced, drawability may be improved, but if the content thereof is excessively low, bake hardenability of the annealed sheet may sharply decrease. Thus, a lower limit of the content of C may be controlled to be 0.0005 wt %, in detail, 0.0008 wt %, and in further detail, 0.0010 wt %.

Silicon (Si): 0.5 wt % or less (excluding 0 wt %)

Si contributes to an increase in strength of a thin steel sheet by solid solution strengthening. However, if a content of Si is excessive, surface scale defects may be caused and surface characteristics of a plating surface may be deteriorated. Thus, according to an exemplary embodiment in the present disclosure, an upper limit of the Si content may be controlled to 0.5 wt %.

Manganese (Mn): 1.2 wt % or less (excluding 0 wt %)

Mn is a solid solution strengthening element, not only contributing to an increase in strength, but also serving to precipitate S in MnS. However, in a case in which the content of Mn is excessive, a problem in which an excessive amount of Mn is solid-dissolved, deteriorating drawability characteristics, may be present. Thus, according to an exemplary embodiment in the present disclosure, an upper limit of Mn content may be controlled to be 1.2 wt %.

Phosphorus (P): 0.005 to 0.12 wt %

P is a relatively most effective element to secure strength of steel, while having a relatively best solid-solution effect and not significantly deteriorating drawability. In order to exhibit such an effect according to an exemplary embodiment, a content of P may be controlled to be 0.005 wt % or more, in detail, 0.008 wt % or more, and in further detail, 0.01 wt % or more. However, if the content thereof is excessive, an excessive amount of P may precipitate FeTiP to deteriorate drawability. Thus, an upper limit of the P content may be controlled to be 0.12 wt %.

Sulfur (S): 0.008 wt % or less (excluding 0 wt %), nitrogen (N): 0.005 wt % or less (excluding 0 wt %)

S and N are inevitably-added impurities present in steel. In order to secure excellent welding characteristics, contents of S and N may be controlled to be relatively low. According to an exemplary embodiment in the present disclosure, the content of S may be controlled to be 0.008 wt % or less, and the content of N may be controlled to be 0.005 wt % or less.

Acid Soluble Aluminum (Al): 0.1 wt % or less (excluding 0 wt %)

Acid-soluble Al precipitates AlN, to contribute to improving drawability and ductility of steel. According to an exemplary embodiment, a lower limit of a content of acid-soluble Al is not particularly limited, but in detail, may be 0.01 wt %, and in detail, 0.02 wt %. However, if the content thereof is excessive, internal defects in a steel sheet may occur due to excessive formation of Al inclusions during a steelmaking process. Thus, an upper limit of the content of acid-soluble Al may be controlled to be 0.1 wt %, in detail, 0.08 wt %, and in further detail, 0.05 wt %.

Titanium (Ti): 0.01 to 0.04 wt %

Ti reacts with solid solution carbon and solid solution nitrogen during hot rolling to precipitate Ti-based carbonitrides, thereby significantly contributing to improvements in the drawability of a steel sheet. In order to exhibit such an effect according to an exemplary embodiment, a content of Ti may be 0.01 wt % or more, in detail, 0.012 wt % or more, and in further detail, 0.015 wt % or more. On the other hand, if the content of Ti is excessive, an excessive amount of FeTiP precipitate may be formed due to a combination of P and Ti remaining after Ti reacts with solid solution carbon and solid solution nitrogen, and thus, there is a possibility that drawability characteristics may be deteriorated. Further, since a large amount of TiC or TiN precipitate may be distributed in steel and a content of C to be cured may thus be relatively low, bake hardenability may be deteriorated. Thus, an upper limit of the content of Ti may be 0.04 wt %, in detail, 0.03 wt %.

In addition, Fe as a remainder thereof, and inevitable impurities, may be included. However, in a general manufacturing process, impurities, not intended, may be inevitably incorporated from a raw material or a surrounding environment, which may not be excluded. Such impurities are not specifically mentioned in this specification, as the impurities are known in the art. Addition of effective components in addition to the above-mentioned composition is not excluded, and in particular, the following components may be further included to further improve mechanical properties of a thin steel sheet.

Niobium (Nb): 0.005 to 0.04 wt %

Nb serves to facilitate formation of texture during annealing by precipitating solid solution carbon in the form of (Ti,Nb)C composite carbide during hot rolling. Further, when Nb is added in a proper amount, plastic anisotropy per direction, 0°, 45° and 90°, may be improved, and thus, plastic deformation anisotropy (r-value) in 0° and 45° directions with respect to 900 may increase. As a result, planar anisotropy Δr of a material reaches a value of around zero (0 level) so that the r-value may be evenly distributed on a plate surface, thereby preventing defects of formability, such as an ear shape of the material, in a forming process. In order to exhibit such an effect according to an exemplary embodiment, a content of Nb may be 0.005 wt % or more. However, if the content thereof is excessive, most of solid solution carbon in steel is precipitated into fine NbC, such that almost solid solution C may not be redissolved even after annealing, thereby deteriorating bake hardenability. Furthermore, since an amount of fine (Ti,Nb)C composite carbide precipitate is relatively small, drawability characteristics may be deteriorated, and a material may be deteriorated due to an increase in a recrystallization temperature. Thus, an upper limit of the Nb content may be 0.04 wt %, in detail, 0.03 wt %, and in further detail, 0.025 wt % or less.

Boron (B): 0.002 wt % or less (excluding 0 wt %)

B serves to suppress brittleness in a secondary operation, due to P in steel. According to an exemplary embodiment, a lower limit of a B content is not particularly limited, but may be 0.0005 wt % or more, in detail, 0.0007 wt % or more. However, if the B content is excessive, since ductility of a steel sheet may be lowered, an upper limit of the B content may be 0.002 wt %, in detail, 0.0015 wt %.

Hereinafter, precipitates and structures of a high-strength thin steel sheet having excellent drawability and bake hardenability will be described in detail.

In the case of a high-strength thin steel sheet according to an exemplary embodiment, P (%) defined by the following equation 1 may be 80% or more, in detail, 82% or more. For example, when the ratio P is less than 80%, for example, in a case in which a large amount of carbide is precipitated at crystal grain boundaries, a possibility of occurrence of cracks during a process may be significantly increased, thereby deteriorating ductility and drawability. As the ratio P increases, ductility and drawability may be improved. Thus, according to an exemplary embodiment, an upper limit of the ratio (P) is not particularly limited. In this case, the carbide refers to a carbide of TiC alone, a carbide of NbC alone, or a (Ti,Nb)C composite carbide.

$$P\ (\%) = \{N_{in}/(N_{in}+N_{gb})\} \times 100,\quad\quad \text{[Equation 1]}$$

where $N_{in}$ is the number of carbides having a size of 20 nm or less, existing inside a crystal grain, and $N_{gb}$ refers to the number of carbides having a size of 20 nm or less existing at a grain boundary.

According to an exemplary embodiment in the present disclosure, a high-strength thin steel sheet may include 0.2 or less of FeTiP precipitates per unit area ($\mu m^2$), in detail, 0.1 or less precipitates. The FeTiP precipitates may mainly be precipitated in an acicular shape, which may be problematic, in that development of {111} orientation during annealing may be negatively affected. If the FeTiP precipitates are formed to exceed 0.2 precipitate/$\mu m^2$, drawability may be deteriorated. On the other hand, as the number of FeTiP precipitates per unit area is reduced, drawability may be improved. Thus, according to an exemplary embodiment, a lower limit of the number of FeTiP precipitates is not particularly limited.

According to an exemplary embodiment, the high-strength thin steel sheet may have a gamma (γ)-fiber texture. An array having a constant plane and orientation, generated inside a crystal, is referred to as a texture, and a form in which such textures are developed as a band in a constant direction is referred to as a fiber texture. The texture is closely related to drawability. It is known in the art that, as a surface strength value of a gamma (γ)-fiber texture, in which a {111} plane is formed to be perpendicular to a rolled surface, among textures, is increased, drawing processability may be improved.

On the other hand, it was found according to an exemplary embodiment in the present disclosure that, in order to form the gamma (γ)-fiber texture as described above, a degree of development of {111}<011> to {111}<112> orientation groups in a position of t/4 (t: thickness of a steel sheet) from a surface of a steel sheet in a thickness direction of the steel sheet is important. In detail, for example, when an average random diffraction intensity ratio of {111}<011> to {111}<112> orientation groups, indicating a degree of development of gamma (γ)-fiber texture (ND//<111>) with respect to alpha (α)-fiber texture (RD//<110>) in which a <110> direction and a rolling direction are parallel to each other, is controlled to be 5 or more in a region of a steel sheet from a steel sheet surface to t/4 (t: thickness of a steel sheet) in a thickness direction of the steel sheet, it could be confirmed that an average plastic anisotropy coefficient (Lankford value, r value) is 2.2 or more and thus excellent drawability may be secured. On the other hand, as the average random diffraction intensity ratio of the orientation groups of {111}<011> to {111}<112> is increased, the gamma (γ)-fiber texture may be formed well to have good drawing characteristics. Thus, an upper limit thereof is not particularly limited. For example, the random diffraction intensity ratio indicates a value calculated by dividing X-ray intensity of a testing material obtained by measuring X-ray intensity of the testing material and a standard sample having no integration in a specific orientation under the same conditions using an X-ray diffraction method, by an X-ray intensity of the standard sample.

On the other hand, the average plastic anisotropy coefficient (Lankford value, r value) obtained from a plastic anisotropy coefficient measured for each direction with respect to a rolling direction may be a representative material characteristic value indicating drawability, and the value may be calculated by the following Equation 2.

$$r\ \text{value} = (r0 + r90 + 2r45)/4 \quad\quad \text{Equation 2,}$$

where r0, r45 and r90 are a plastic anisotropy coefficient measured in a specimen taken in a direction of 0 degree, 45 degrees and 90 degrees, respectively, from a rolling direction, in general, ri is a plastic anisotropy coefficient measured in a specimen taken in a direction of i° from a rolling direction.

It can be determined from Equation 1 above that, as the r value increases, a depth of a forming cup in a drawing process may be increased, and thus, drawability may be improved. The thin steel sheet according to an exemplary embodiment may have an r value of 2.2 or more to exhibit excellent drawability.

Further, the thin steel sheet according to an exemplary embodiment may have a bake hardening amount (BH) of 4 MPa or more, in detail, 10 MPa or more, and in further detail, 15 MPa or more, and thus, may exhibit excellent bake hardenability.

The high-strength thin steel sheet having excellent drawability and bake hardenability according to an exemplary embodiment may be manufactured by various methods, and the manufacturing method thereof is not particularly limited. However, as an exemplary embodiment, a high-strength thin steel sheet may be manufactured using the following method.

Hereinafter, a method of manufacturing a high-strength thin steel sheet having excellent drawability and bake hardenability according to another exemplary embodiment will be described in detail.

A method of manufacturing a high-strength thin steel sheet according to another exemplary embodiment may include hot-rolling a steel slab having a foregoing alloy composition to obtain a hot-rolled steel sheet; winding the hot-rolled steel sheet; cold-rolling the wound hot-rolled steel sheet to obtain a cold-rolled steel sheet; continuously annealing the cold-rolled steel sheet; and cooling the annealed cold-rolled steel sheet to 650° C.

In the case of the winding above, a coiling temperature may be 450 to 750° C., in detail, 500 to 700° C. If the coiling temperature is lower than 450° C., a relatively large amount of FeTiP precipitates may be generated to deteriorate drawability, and plate warpage may occur. On the other hand, if the coiling temperature exceeds 750° C., it may be difficult to redissolve solid solution carbon during annealing to deteriorate bake hardenability (BH), as well as precipitates becoming coarse.

During the cold rolling, a cold rolling reduction ratio may be 75 to 85%. If the reduction ratio in the cold rolling is excessively low, a gamma (γ)-fiber texture may not sufficiently grow to deteriorate drawability. Thus, a lower limit of the reduction ratio in the cold rolling may be 75%. On the other hand, if the reduction ratio in the cold rolling is excessively high, a roll load during rolling may be heavy, and thus, a shape of the steel sheet may be defective. Thus, an upper limit of the reduction ratio in the cold rolling may be 85%.

In cold rolling, a final rolling reduction ratio (final rolling reduction ratio/total reduction ratio) may be 5 to 15%. If the final rolling reduction ratio is excessively low, a relatively large amount of carbide may be precipitated at crystal grain boundaries, and nucleation generation and development of a gamma (γ)-fiber texture may not be sufficient, thereby deteriorating drawability. Thus, a lower limit of the final rolling reduction ratio may be 5%. On the other hand, if the final rolling reduction ratio is excessively high, a possibility of an occurrence of a plate fracture may be increased, due to a rolling load. Thus, an upper limit of the final rolling reduction ratio may be 15%.

At the time of performing continuous annealing, a rate of temperature rise to an annealing temperature may be 7° C./sec or less (excluding 0° C./sec). If the rate of temperature rise exceeds 7° C./sec, nucleation generation and development of {111} texture may be insufficient, and thus, drawability may be deteriorated.

In the continuous annealing, the annealing temperature may be 830 to 880° C., in detail, 850 to 870° C. If the annealing temperature is lower than 830° C., the gamma (γ)-fiber texture advantageous for workability may not grow sufficiently to deteriorate drawability, and further, precipitates may not be redissolved during annealing to deteriorate bake hardenability (BH). On the other hand, if the annealing temperature exceeds 880° C., workability may be good, but a shape of the steel sheet may be poor due to deviations in grain size, and there is a possibility that a problem may occur in equipment due to annealing heating.

In the continuous annealing, a holding time at the annealing temperature may be 30 to 80 sec, in detail, 40 to 70 sec. For example, when a sufficient annealing holding time is secured after the gamma (γ)-fiber texture is sufficiently developed, a portion of carbide may be redissolved as solid solution C, and when cooling is performed in a state in which solid solution C is present, an appropriate level of solid solution C may remain in a final thin steel sheet, thereby exhibiting excellent bake hardenability (BH). If the annealing holding time is less than 30 sec, the solid solution C in the final steel sheet may not remain or may be insufficient, due to shortage of a redissolving time, thereby deteriorating bake hardenability (BH). On the other hand, if the annealing holding time exceeds 80 sec, crystal grains may be coarsened due to excessive annealing holding time, and a shape of a steel sheet may be degraded due to an occurrence of deviations in crystal grains, which may also be negative in view of economy due to a relatively low sheet passing speed.

In the case of the cooling, an average cooling rate to 650° C. may be 2 to 10° C./sec, in detail, 3 to 8° C./sec. If the average cooling rate is less than 2° C./sec, solid solution carbon having being redissolved during annealing may be re-precipitated as a carbide, to deteriorate bake hardenability, and the re-precipitated carbide may be diffused to grain boundaries to lower drawability. If the average cooling rate exceeds 10° C./sec, distortion of a plate shape may occur. On the other hand, 650° C. is a temperature at which most of precipitation and diffusion of carbides is completed, and cooling conditions thereafter are not particularly limited.

Conditions, not particularly limited other than the above-mentioned conditions, may be performed, based on conditions of manufacturing general thin steel sheets. In addition, the method of manufacturing a high-strength thin steel sheet may further include performing hot dip galvanizing on a surface of a thin steel sheet after annealing, or may further include performing alloying heat treatment after performing hot dip galvanizing. As an exemplary embodiment, the process conditions in respective processes will be described as follows.

Hot Finish Rolling Temperature: Ar3 or More

In the case of finish rolling, the finish rolling may be performed in an austenite single phase station in principle, such that uniformity in structure may be increased by performing finishing rolling in the austenite single phase station to apply relatively uniform deformation to the structure basically comprised of single-phase crystal grains. If the hot finish rolling temperature is less than Ar3, since a high possibility of two-phase station rolling is present, material non-uniformity may occur. For example, Ar3 may be calculated from the following Equation 3, $$Ar3(° C.)=910-310[C]-80[Mn]-20[Cu]-15[Cr]-55[Ni]-80[Mo]$$ Equation 3, where [C], [Mn], [Cu], [Cr], [No] and [Mo] respectively indicate wt % of respective elements corresponding thereto.

Alloying Heat Treatment Temperature: 450 to 600° C.

As described above, the method of manufacturing a high-strength thin steel sheet may further include performing hot dip galvanizing on a surface of a thin steel sheet after annealing, or performing an alloying heat treatment after performing hot dip galvanizing. In this case, an alloying heat treatment temperature may be 450 to 600° C. If the alloying heat treatment temperature is lower than 450° C., alloying may not be sufficient, and a reduction of sacrificial operation performance or a deterioration of plating adhesion may occur. If the alloying heat treatment temperature exceeds 600° C., excessive alloying may be performed to deteriorate powdering characteristics. On the other hand, a Fe concentration in a plating layer after the alloying heat treatment may be 8 to 12 wt %.

MODE FOR INVENTION

Hereinafter, exemplary embodiments in the present disclosure will be described in more detail by way of examples, to understand the invention in further detail, and thus, do not limit the scope of the invention.

Steel slabs having a thickness of 220 mm and having an alloy composition shown in the following Table 1 were heated to 1200° C. and were hot-rolled, to obtain hot-rolled steel sheets having a thickness of 3.2 mm, to then be wound under conditions described in Table 2 below. In this case, a finish rolling temperature was set to be the same temperature of about 930° C., immediately above Ar3. Thereafter, the hot-rolled steel sheets were pickled, and then, were subjected to cold rolling, annealing and cooling under conditions shown in Table 2, to produce thin steel sheets.

Then, the number and distribution of precipitates, texture thereof, and the like, with respect to the produced, respective thin steel sheets, were observed and measured, and results thereof are shown in Table 3 below. In detail, a ratio of the number of carbides, and the number of FeTiP precipitates, were calculated by observing precipitates in replica using a TEM and then counting the numbers of precipitates per unit length (μm) with respect to five segments to obtain an average value thereof. In the case of the texture, an intensity ratio for respective orientations, for example, using ODF, was calculated and analyzed using EBSD, based on an ND crystal orientation map, under rolling (R), transverse (T) and vertical (N) conditions at a ¼t point of a steel sheet.

Then, r values and bake hardening amounts (BH) were measured for the respective manufactured thin steel sheets. Specimens were obtained based on JIS Standards, No. 5, the r values thereof were measured using ASTM STD specimen, and bake hardenability was evaluated via a difference between a yield strength value obtained after 2% pre-straining of the specimen and a yield strength value obtained by again maintaining the specimen at 170° C. for 20 minutes.

TABLE 1

| Steel Grade | Alloy Composition (wt %) | | | | | | | | |
|---|---|---|---|---|---|---|---|---|---|
| | C | Si | Mn | P | S | Sol. Al | Ti | Nb | B |
| Steel 1 in Embodiment | 0.0018 | 0.021 | 0.1 | 0.11 | 0.0056 | 0.035 | 0.021 | 0.01 | 0.0008 |
| Steel 2 in Embodiment | 0.0021 | 0.015 | 0.2 | 0.03 | 0.0058 | 0.032 | 0.022 | 0.011 | — |
| Steel 3 in Embodiment | 0.0020 | 0.015 | 0.2 | 0.03 | 0.0056 | 0.032 | 0.022 | 0.031 | — |
| Steel 4 in Embodiment | 0.0019 | 0.013 | 0.6 | 0.03 | 0.0068 | 0.036 | 0.018 | 0.023 | 0.0009 |
| Steel 5 in Embodiment | 0.018 | 0.013 | 0.6 | 0.03 | 0.0064 | 0.036 | 0.036 | 0.023 | 0.0009 |
| Steel 6 in Embodiment | 0.0016 | 0.008 | 1.1 | 0.05 | 0.0059 | 0.041 | 0.028 | 0.011 | 0.0012 |
| Steel 7 in Embodiment | 0.0017 | 0.008 | 1.1 | 0.05 | 0.0059 | 0.041 | 0.028 | — | 0.001 |
| Steel 1 in Comparative Example | 0.0035 | 0.022 | 0.3 | 0.10 | 0.0041 | 0.048 | 0.055 | — | 0.0023 |
| Steel 2 in Comparative Example | 0.0041 | 0.008 | 0.5 | 0.07 | 0.0035 | 0.042 | 0.048 | — | 0.001 |

TABLE 2

| | Cold Rolling | | Annealing | | | Cooling | |
|---|---|---|---|---|---|---|---|
| Steel Grade | Winding Temp (° C.) | Reduction Ratio (%) | Final Rolling Reduction Ratio (%) | Temp (° C.) | Rate of Temp Rise (° C./sec) | Holding Time (sec) | Cooling Rate (° C./sec) | Remark |
| Steel 1 in Embodiment | 638 | 81.5 | 8.9 | 852 | 5.6 | 54 | 3.4 | Embodiment 1 |
| | 412 | 81.3 | 8.8 | 853 | 5.5 | 55 | 4.6 | Comparative Example 1 |
| Steel 2 in Embodiment | 585 | 74.3 | 10.2 | 825 | 5.5 | 22 | 6.5 | Comparative Example 2 |
| | 625 | 79.8 | 11.3 | 861 | 5.6 | 58 | 4.0 | Embodiment 2 |
| Steel 3 in Embodiment | 580 | 73.3 | 10.2 | 825 | 5.5 | 45 | 3.5 | Comparative Example 3 |
| | 620 | 79.6 | 11.0 | 856 | 5.6 | 48 | 3.1 | Embodiment 3 |
| Steel 4 in Embodiment | 612 | 80.3 | 14.1 | 862 | 5.4 | 58 | 5.0 | Embodiment 4 |
| | 765 | 80.1 | 3.9 | 854 | 10.2 | 93 | 1.5 | Comparative Example 4 |
| Steel 5 in Embodiment | 611 | 80.1 | 12.1 | 852 | 5.4 | 58 | 3.5 | Embodiment 5 |
| | 723 | 80.3 | 7.8 | 814 | 6.8 | 52 | 3.6 | Comparative Example 5 |
| Steel 6 in Embodiment | 635 | 79.8 | 16.2 | 855 | 6.2 | 62 | 1.7 | Comparative Example 6 |
| | 628 | 80.2 | 6.8 | 848 | 6.3 | 51 | 5.0 | Embodiment 6 |
| Steel 7 in Embodiment | 632 | 79.4 | 16.2 | 854 | 6.2 | 25 | 13.2 | Comparative Example 7 |
| | 628 | 80.6 | 6.5 | 845 | 6.3 | 51 | 3.0 | Embodiment 7 |
| Steel 1 in Comparative Example | 650 | 76.3 | 3.9 | 851 | 6.5 | 55 | 5.0 | Comparative Example 8 |
| | 648 | 77.5 | 8.2 | 842 | 6.2 | 56 | 5.0 | Comparative Example 9 |
| Steel 2 in Comparative Example | 560 | 78.2 | 5.8 | 842 | 6.4 | 58 | 5.0 | Comparative Example 10 |
| | 585 | 78.3 | 7.2 | 852 | 5.9 | 57 | 5.0 | Comparative Example 11 |

TABLE 3

| Steel Grade | P (%) | Number of FeTiP precipitates per μm² | Surface Strength Ratio* | YS (MPa) | BH (MPa) | R Value | Remark |
|---|---|---|---|---|---|---|---|
| Steel 1 in Embodiment | 83 | 0.07 | 16.5 | 178 | 16.5 | 2.28 | Embodiment 1 |
|  | 73 | 0.25 | 2.8 | 179 | 4.5 | 1.85 | Comparative Example 1 |
| Steel 2 in Embodiment | 77 | 0.08 | 3.4 | 182 | 0 | 1.82 | Comparative Example 2 |
|  | 86 | 0.06 | 14.3 | 186 | 13.2 | 2.21 | Embodiment 2 |
| Steel 3 in Embodiment | 65 | 0.52 | 4.8 | 202 | 1.5 | 1.75 | Comparative Example 3 |
|  | 81 | 0.12 | 7.5 | 196 | 6.2 | 2.21 | Embodiment 3 |
| Steel 4 in | 86 | 0.05 | 15.0 | 211 | 15.7 | 2.23 | Embodiment 4 |
|  | 68 | 0.02 | 2.7 | 208 | 4.2 | 1.81 | Comparative Example 4 |
| Steel 5 in Embodiment | 82 | 0.15 | 7.6 | 211 | 5.6 | 2.23 | Embodiment 5 |
|  | 78 | 0.12 | 3.6 | 215 | 2.2 | 1.91 | Comparative Example 5 |
| Steel 6 in Embodiment | 79 | 0.08 | 4.1 | 211 | 5.2 | 1.92 | Comparative Example 6 |
|  | 83 | 0.07 | 12.8 | 217 | 15.2 | 2.25 | Embodiment 6 |
| Steel 7 in Embodiment | 79 | 0.06 | 4.3 | 214 | 3.2 | 1.86 | Comparative Example 7 |
|  | 83 | 0.05 | 8.2 | 208 | 18 | 2.22 | Embodiment 7 |
| Steel 1 in Comparative Example | 63 | 1.3 | 1.2 | 208 | 0 | 1.78 | Comparative Example 8 |
|  | 65 | 1.2 | 1.3 | 207 | 0 | 1.75 | Comparative Example 9 |
| Steel 2 in Comparative Example | 73 | 1.5 | 1.6 | 215 | 0 | 1.81 | Comparative Example 10 |
|  | 71 | 1.7 | 1.3 | 213 | 0 | 1.79 | Comparative Example 10 |

*The surface strength ratio refers to an average random strength ratio of {111}<011> to {111}<112> orientation groups with respect to a gamma(γ)-fiber texture in which a <110> direction and a rolling direction are parallel to each other, in a region of a steel sheet from a steel sheet surface to t/4(t: thickness of a steel sheet) in a thickness direction of the steel sheet.

As can be seen from Tables 1 to 3, in the case of Embodiments 1 to 7 of the present disclosure, satisfying the alloy composition and manufacturing conditions proposed according to an exemplary embodiment in the present disclosure, it can be seen that the number of FeTiP precipitates per unit area, a ratio of carbide having a size of 20 nm or less, present in ferrite crystal grains, and an average random diffraction intensity ratio of orientation groups of {111}<011> to {111}<112> at a ¼ thickness position all satisfy ranges controlled according to an exemplary embodiment in the present disclosure, and basically secure a yield strength of 170 MPa or more, BH of 4 MPa or more, and an r value of 2.2 or more.

However, in the case of Comparative Examples 1 to 7, an alloy composition thereof satisfies the range suggested by an exemplary embodiment in the present disclosure, but one or more of manufacturing conditions thereof do not satisfy the range suggested according to an exemplary embodiment, thereby deteriorating drawability and bake hardenability. In addition, in the case of Comparative Examples 8 to 11, an alloy composition does not satisfy the range proposed according to an exemplary embodiment in the present disclosure, thereby deteriorating drawability and bake hardenability.

On the other hand, FIG. 1 provides images obtained by observing cross sections of ¼t points of thin steel sheets, in replica using TEM. (a) of FIG. 1 illustrates a cross section of a thin steel sheet according to Embodiment 1 of the present disclosure, while (b) of FIG. 1 illustrates a cross section of a thin steel sheet of Comparative Example 1.

The invention claimed is:

1. A comprising:
0.0005 wt % to 0.003 wt % of carbon (C); 0.5 wt % or less excluding 0 wt % of silicon (Si); 1.2 wt % or less excluding 0 wt % of manganese (Mn); 0.005 wt % to 0.12 wt % of phosphorous (P); 0.008 wt % or less of sulfur (S); 0.005 wt % or less of nitrogen (N); 0.1 wt % or less excluding 0 wt % of acid-soluable aluminum (Al); 0.01 wt % to 0.04 wt % of titanium (Ti); iron (Fe) as a remainder thereof, and unavoidable impurities;
P (%) of 80% or more, P (%) being defined by Equation 1: P (%)=({$N_{in}$/($N_{in}$+$N_{gb}$)}×100, where $N_{in}$ denotes the number of carbides present within a crystal grain having a size of 20 nm or less, and $N_{gb}$ denotes the number of carbides present at a grain boundary of the crystal grain; and
a bake hardenability (BH) of 4 MPa or more.

2. The steel sheet of claim 1, further comprising: 0.005 wt % to 0.04 wt % of niobium (Nb).

3. The steel sheet of claim 1, further comprising: 0.002 wt % or less excluding 0 wt % of boron (B).

4. The steel sheet of claim 1, further comprising: 0.2 or less of FeTiP precipitates per unit area (μm²).

5. The steel sheet of claim 1, wherein, in a region of the steel sheet from a steel sheet surface to t/4 (t: thickness of the steel sheet) in a thickness direction of the steel sheet, an average random strength ratio of {111}<011> to {111}<112> orientation groups with respect to an alpha (α)-fiber texture in which a <110> direction and a rolling direction are parallel to each other is 5 or more.

6. The steel sheet of claim 1, further comprising: a lankford value (r value) of 2.2 or more.

7. The steel sheet of claim 1, further comprising a hot-dip galvanized layer formed on a surface of the steel sheet.

8. The steel sheet of claim 1, further comprising an alloyed hot-dip galvanized layer formed on a surface of the steel sheet.

9. A method of manufacturing a steel sheet, the method comprising:
- hot-rolling a steel slab to obtain a hot-rolled steel sheet, the steel slab including 0.0005 wt % to 0.003 wt % of carbon (C), 0.5 wt % or less excluding 0 wt % of silicon (Si), 1.2 wt % or less excluding 0 wt % of manganese (Mn), 0.005 wt % to 0.12 wt % of phosphorous (P), 0.008 wt % or less of sulfur (S), 0.005 wt % or less of nitrogen (N), 0.1 wt % or less excluding 0 wt % of acid-soluable aluminum (Al), 0.01 wt % to 0.04 wt % of titanium (Ti), iron (Fe) as a remainder thereof, and unavoidable impurities, and obtaining a hot-rolled steel sheet;
- winding the hot-rolled steel sheet at a temperature of 450° C. to 750° C. to obtain a coiled steel sheet;
- cold-rolling the coiled steel sheet under conditions of a total reduction ratio of 75% to 85% and a ratio of a final rolling reduction ratio to the total reduction ratio of 6.5% to 14.1%, to obtain a cold-rolled steel sheet;
- continuously annealing the cold-rolled steel sheet by heating the cold-rolled steel sheet to an annealing temperature of 830° C. to 880° C. at a rate of 7° C./sec or lower and then maintaining the annealing temperature for 30 sec. to 80 sec. to obtain an annealed steel sheet; and
- cooling the annealed steel sheet to 650° C. at an average cooling rate of 2° C./sec to 10° C./sec thereby producing the steel sheet of claim 1.

10. The method of claim 9, wherein the steel slab further comprises: 0.005 wt % to 0.04 wt % of niobium (Nb).

11. The method of claim 9, wherein the steel slab further comprises: 0.002 wt % or less excluding 0 wt % of boron (B).

12. The method of claim 9, wherein the hot-rolling comprises: a hot-finish rolling at Ar3 or higher.

13. The method of claim 9, further comprising: hot-dip galvanizing annealed steel sheet.

14. The method of claim 9, further comprising:
- hot-dip galvanizing the annealed steel sheet to obtain a galvanized steel sheet; and
- heat-treating the galvanized steel sheet at a temperature of 450° C. to 600° C.

* * * * *